US011843226B2

(12) United States Patent
Vitek et al.

(10) Patent No.: US 11,843,226 B2
(45) Date of Patent: Dec. 12, 2023

(54) LAMINATED BUSBARS AND DIRECT CONNECTION OF AIR CIRCUIT BREAKERS IN BUS COUPLER SECTIONS

(71) Applicant: ABB Schweiz AG, Baden (CH)

(72) Inventors: Libor Vitek, Namest nad Oslavou (CZ); Jindrich Janos, Brno (CZ); Klaus Kraft, Heidelberg (DE); Francoise Molitor, Zürich (CH)

(73) Assignee: ABB Schweiz AG, Baden (CH)

( * ) Notice: Subject to any disclaimer, the term of this patent is extended or adjusted under 35 U.S.C. 154(b) by 182 days.

(21) Appl. No.: 17/541,831

(22) Filed: Dec. 3, 2021

(65) Prior Publication Data

US 2022/0173578 A1    Jun. 2, 2022

Related U.S. Application Data

(63) Continuation of application No. PCT/EP2019/064571, filed on Jun. 5, 2019.

(51) Int. Cl.
  *H02B 1/20*   (2006.01)
  *H02G 5/00*   (2006.01)

(52) U.S. Cl.
  CPC ............... *H02B 1/20* (2013.01); *H02G 5/005* (2013.01); *H02G 5/007* (2013.01)

(58) Field of Classification Search
  None
  See application file for complete search history.

(56) References Cited

U.S. PATENT DOCUMENTS

| | | | | |
|---|---|---|---|---|
| 3,489,846 A | * | 1/1970 | Fehr, Jr. | ............... H02G 5/002 |
| | | | | 174/88 B |
| 3,732,523 A | * | 5/1973 | Fouse | ..................... H02G 5/08 |
| | | | | 174/71 B |

(Continued)

FOREIGN PATENT DOCUMENTS

| DE | 102011085517 A1 | 5/2013 |
|---|---|---|
| DE | 102005015945 B4 | 7/2015 |

(Continued)

OTHER PUBLICATIONS

European Patent Office, International Search Report in International Patent Application No. PCT/EP2019/064571, 3 pp. (dated Feb. 11, 2020).

(Continued)

*Primary Examiner* — Courtney L Smith
(74) *Attorney, Agent, or Firm* — Leydig, Voit & Mayer, Ltd.

(57) ABSTRACT

A coupling element for electrically coupling a lateral connecting portion of a first laminated busbar to a lateral connecting portion of a second laminated busbar, the coupling element having a base body that includes a sandwich of conducting layers of sheet metal and intermediate insulating layers arranged in between the conducting layers for electrically insulating the conducting layers from each other. Each of the conducting layers includes a first layer section that is associated to the lateral connecting portion of the first busbar and a second layer section that is associated to the connecting portion of the second busbar. The first and second layer sections are electrically insulated from each other by an insulating element and each of the first layer sections includes a first circuit breaker connecting terminal that is adapted to be electrically connected to an input terminal of a circuit breaker.

10 Claims, 2 Drawing Sheets

(56) References Cited

U.S. PATENT DOCUMENTS

| | | | | |
|---|---|---|---|---|
| 4,112,249 A | * | 9/1978 | Carlson | H02G 5/08 |
| | | | | 174/68.2 |
| 5,466,974 A | * | 11/1995 | Sutrina | H02B 1/20 |
| | | | | 307/38 |
| 5,619,014 A | * | 4/1997 | Faulkner | H02G 5/007 |
| | | | | 174/68.2 |
| 9,705,300 B1 | * | 7/2017 | Maurer | H02G 5/007 |
| 2021/0234343 A1 | * | 7/2021 | Yang | H02B 1/04 |

FOREIGN PATENT DOCUMENTS

| | | |
|---|---|---|
| WO | WO 2013/166562 A1 | 11/2013 |
| WO | WO 2013/166652 A1 | 11/2013 |

OTHER PUBLICATIONS

European Patent Office, Written Opinion in International Patent Application No. PCT/EP2019/064571, 5 pp. (dated Feb. 11, 2020).

* cited by examiner

LAMINATED BUSBARS AND DIRECT CONNECTION OF AIR CIRCUIT BREAKERS IN BUS COUPLER SECTIONS

CROSS-REFERENCE TO PRIOR APPLICATION

This application is a continuation of International Patent Application No. PCT/EP2019/064571, filed on Jun. 5, 2019, the entire disclosure of which is hereby incorporated by reference herein.

FIELD

The present disclosure is directed to a coupling element for electrically coupling the lateral connecting portions of a first and a second laminated busbar via a circuit breaker and an arrangement including such an element.

BACKGROUND

Laminated Multi-phase busbars or multi-layer busbars are used in switchgears to conduct and distribute alternating electrical current to different electrical devices which are usually installed in switch gear cabinets. In order to provide for the possibility to conduct all three or even more phases of an alternating current in a single busbar, multi-phase busbars have been developed which comprise a base layer and a cover layer of electrically insulating material between which two or more layers of conducting sheet metal, in particular copper, are arranged which are electrically insulated from each other by means of insulating intermediate layers. Instead of conducting the different phases of an alternating current as described before, the busbars can also be used for distributing direct current, which may be distributed by the busbar at different voltage levels, e.g. with a higher voltage of for example 380 V for driving high power electric drives and a lower control voltage of for example 12 V for transmitting control signals for controlling the drives. For reasons of simplification, but both busbars, the AC and DC busbars, are hereinafter referred to as laminated busbars. However, one or more embodiments of the invention is hereinafter described and explained with reference to a laminated multi-phase AC busbar.

An afore-described busbar in which the different layers are laminated to each other by means of liquid resin is described in DE 10 2005 015 945 B4 of the applicant. The laminated busbar has the advantage that it is compact and does not tend to delaminate due to repellant forces which are generated by the alternating electric currents that are conducted in the different conducting layers for each phase and which in case of a short circuit can be in the range of several thousand ampere (kA).

In order to supply electric energy from a power source to a laminated multi-phase busbar, it is known to remove the insulating material in a lateral section of the sandwich of layers and expand the uncoated conducting layers which project from the intermediate insulating layers, so as to provide for three or more lateral connecting portions, that is one for each phase and preferably one for protective earth, to which the terminals of the electric power source can be connected.

The lateral connecting portions are also used to provide for an electrical connection between two busbars or busbar sections having a shorter length. This allows to split up the busbars for easier handling and shipment. After shipping, the busbars or busbar sections are electrically interconnected by means of a coupling element which comprises a base body having a sandwich of conducting layers for each phase and insulating layers arranged there between. Each of the conducting layers of the base body comprises associated terminal members at its lateral edges which are adapted to contact the uncoated terminal sections at the lateral connecting portion of each busbar, respectively. The coupling elements are usually mechanically clamped to the associated lateral connecting portions, in order to provide for a reliable electrical and mechanical coupling. A switch gear comprising two laminated busbars with connecting pins which project in a direction perpendicular to the plane of the conducting layers and which are coupled by a coupling element is described in WO-A-2013/166 562.

In known low voltage switch gear systems, the connection of circuit breakers is usually done by means of flat copper bars which are connected to each busbar separately. As these connections are basically point to point connections which have one connection at the ACB terminal of the circuit breaker and a second connection at the busbar system, the above-described known circuit breakers cannot be directly connected to the connecting pins of the laminated busbar of WO-A 2013/166 652, which project out from the conducting layers of each electrical phase through the adjoining insulating layers into the interior space of the switchgear cabinet. Therefore a space consuming mounting equipment is required, in order to couple a circuit breaker to the cylindrical connecting pins projecting from the front side of each of the two busbars.

Moreover, it is a further shortcoming of the busbar system of WO-A2013/166 652 that there is no current protection device which protects the conducting layers of each of the three electrical phases of the first busbar against an overcurrent which is e.g. caused by a short circuit that occurs in the conducting layers of the second busbar, when the busbars are electrically connected to each other by the coupling element. Thus, there is a high risk that a short circuit in the conducting layers of the first busbar damages the conducting layers of the second busbar, e.g. by causing a delamination of the layers.

SUMMARY

One or more embodiments of the present invention may provide a coupling element for electrically coupling a lateral connecting portion of a first laminated busbar to a lateral connecting portion of a second laminated busbar, the coupling element having a base body that comprises a sandwich of conducting layers of sheet metal and intermediate insulating layers arranged in between the conducting layers for electrically insulating the conducting layers from each other, wherein: each of the conducting layers comprises a first layer section that is associated to the lateral connecting portion of the first busbar and a second layer section that is associated to the connecting portion of the second busbar, the first and second layer sections are electrically insulated from each other by an insulating element and wherein each of the first layer sections comprises a first circuit breaker connecting terminal that is adapted to be electrically connected to an input terminal of a circuit breaker, and each of the second layer sections comprises a second circuit breaker connecting terminal that is adapted to be electrically connected to an output terminal of the circuit breaker.

In one aspect, the present disclosure describes providing a coupling element for electrically coupling the lateral connecting portions of a first and a second laminated multi-phase busbar, which allows for a protection of the first busbar against an overcurrent which is caused in the second busbar and vice versa.

In another aspect, the present disclosure describes providing an arrangement for electrically coupling a first and a second laminated multi-phase busbar which safely protects each busbar against damages which are caused by an overcurrent that occurs in the other busbar.

In yet another aspect, the present disclosure describes providing a switchgear which includes an electrically coupled first and second laminated busbar with an improved overcurrent protection.

BRIEF DESCRIPTION OF THE DRAWINGS

One or more embodiments of the present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
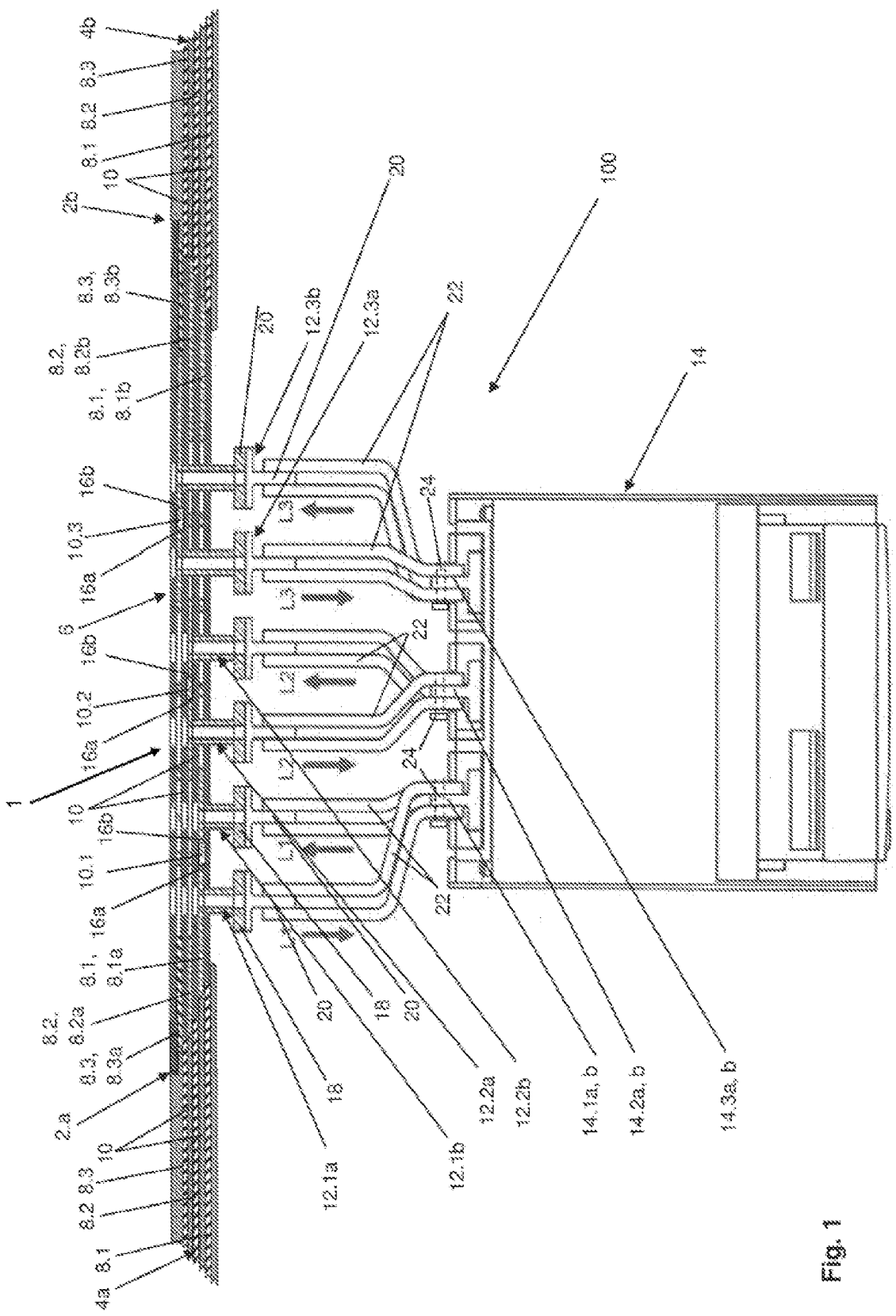
FIG. 1 is a schematic cross sectional view of a first and a second laminated busbar having three conducting layers for conducting three electrical phases of an AC current which are electrically coupled at their lateral connecting portions by an arrangement according to one or more embodiments of the present invention which includes a coupling element according to one or more embodiments of the invention and a circuit breaker mounted thereto.

According to one or more embodiments of the invention, a coupling element for electrically coupling a lateral connecting portion of a first laminated busbar to a lateral connecting portion of a second laminated busbar comprises a base body which has a sandwich of conducting layers of sheet metal which are associated to each phase of an electric alternating current that is conducted by the first and second laminated busbars. The coupling element further comprises a plurality of intermediate insulating layers which are arranged between the conducting layers and which serve to electrically insulate the conducting layers from each other.

The coupling element is characterized in that each of the conducting layers comprises a first layer section which is associated to the first lateral connecting portion of the first busbar and in addition comprises a second layer section which is associated to the connecting portion of the second busbar. According to one or more embodiments of the invention, the first and second layer sections are electrically insulated from each other by an insulating element, and each of the first layer sections comprises a first circuit breaker connecting terminal which is adapted to be electrically connected to an input terminal of a circuit breaker. Moreover, each of the second layer sections of the conducting layers of the base body comprises a second circuit breaker connecting terminal which is adapted to be electrically connected to an output terminal of a circuit breaker, which is preferably also mounted to the base body by means of an electrical and mechanical coupling between the first and second circuit breaker connecting terminals.

The busbar-coupling element according to one or more embodiments of the invention provides for the advantage that there is no additional space needed for installing the circuit breaker on either one of the first and second laminated multi-layer busbars, but the space of the coupling element between the two busbars, which is usually wasted, is advantageously utilized for mounting the circuit breaker.

In one or more embodiments of the invention the insulating element which electrically insulates the first and second layer sections of each conducting layer in the base body from each other comprises a strip of insulating material which extends preferably across the entire width of the base body between the neighboring lateral edges of the first and second layer section. Alternatively, a gap which is filled with air, may be used instead of a strip of insulating material, in order to efficiently insulate the first layer section from the adjoining second layer section of an electrical phase in the base body.

In a preferred embodiment of the invention, the insulating element may be formed of plastics material, in particular fiber reinforced resin or by a strip of cured resin, which may be positioned between the neighboring lateral edges of each layer section before laminating the insulating layers on top of a conducting layer of the base body.

According to another object of the invention, each of the first and second circuit breaker connecting terminals may comprise at least one cylindrical connecting pin which is mounted to an associated one of the first and second layer sections of a corresponding conducting layer of the base body. The conducting pin, which is preferably made of the same material as the sheet-metal of the conducting layer, preferably copper, projects away from the conducting layer through a common hole which is formed in the sandwich of adjoining insulating layers and conducting layers.

In this embodiment, each of the first and second circuit breaker connecting terminals preferably comprises a plurality of preferably cylindrical pins mounted two each layer section in the way as described herein before, which are arranged in a line at a preferably equal distance to each other across the width of the base body. In a preferred embodiment, there may be five cylindrical connecting pins arranged in one line which are all connected to the same layer section of the conducting layer in the base body. In this embodiment the connecting pins are mechanically interconnected by a common electrically conducting distribution bar which is mounted to the free end portion of each cylindrical connecting pin, e.g. by means of screws. This provides for the advantage that the electrical current which is conducted through the first and second layer section of each conducting layer in the base body is substantially evenly distributed over a larger area of each layer section, so that the local current running through each connecting pin, and therefore the thermal load, is significantly reduced. However, it is also conceivable to use two or more lines/rows of connecting pins instead of only one line, which are electrically connected to the same layer section of a conducting layer, in order to further reduce the electric current running through the cylindrical connecting pins of that layer section.

According to another object of the subject invention, each of the first and second circuit breaker connecting terminals may comprise an L-shaped or T-shaped terminal member which is mounted at each distribution bar. The terminal members, which may be made of copper and screwed or clamped or otherwise be mechanically connected to the associated distribution bars, are adapted to be connected to a first end portion of a cranked and/or curved and/or angled connecting bar. The curve and/or angled connecting bar which is made of conducting material like copper, in turn is adapted to be mechanically and electrically connected to a respective one of the input terminals and output terminals of a circuit breaker with its second end portion. This design has the advantage that the coupling element is very flexible with regard to a mounting of different types of known circuit breakers having different shapes, sizes and configurations of connecting terminals. In the preferred embodiment, the L shape or T-shaped terminal member is preferably mounted to the center of the associated distribution bar, which allows for an even more homogenous distribution of the current which is fed from the associated layer section of the base body through the connecting pins and the distribution bar to the input terminal or output terminal of a circuit breaker.

In one or more embodiments of the present invention, the connecting bar comprises clamping elements for mechanically clamping the first end portion of the connecting bars to the L-shaped or T-shaped terminal members of the circuit breaker connecting terminals and the associated input terminals or output terminals provided at the circuit breaker, respectively.

This embodiment allows for an easy and fast mounting of circuit breakers of different types and shapes to the coupling element, in order to obtain an arrangement of one or more embodiments of the invention which consist of an aforedescribed coupling element and a circuit breaker mounted thereto, which can be readily installed in a switch gear as a unit, in order to electrically couple a first laminated busbar to a second laminated busbar.

According to another object of one or more embodiments of the invention, this arrangement including the aforedescribed coupling element and the circuit breaker electrically and mechanically coupled thereto, is preferably used to electrically interconnect a first and a second laminated busbar in a switchgear by means of the circuit breaker, in order to avoid that the first busbar is damaged in case of an overcurrent in the second busbar and vice versa.

As it is shown in FIG. 1, a first and a second laminated busbar 4a, 4b which may be installed as a rear wall in a switch gear cabinet (not shown) comprises three conducting layers 8.1 to 8.3 for each phase L1, L2, L3 of an electric current to be distributed by the laminated busbars 4a, 4b. Each of the two laminated busbars 4a, 4b comprises a lateral connecting portion 2a, 2b, which serves to interconnect the two busbars 4a, 4b after shipping the same to a customer or the like. The first and the second laminated busbar 4a, 4b may have further connecting portions (not shown), in order to build up a long continuous busbar to which different types of known electrical devices like metering devices, fuses, switches or electronic components etc. may be connected.

As it is further shown in FIG. 1, a coupling element 1 for electrically coupling the lateral connecting portion 2a of the first busbar 4a to the lateral connecting portion 2b of the second comprises a base body 6 which is formed as a sandwich of conducting layers (8.1, 8.2, 8.3) of sheet metal which are associated to each phase L1, L2, L3 of an electric current conducted by the two busbars 4a, 4b. As the first busbar 4a and the second busbar 4b under normal operating conditions conduct the same electric phase of an electric current, all of the conducting layers of the coupling element 1 and the busbars 4a, 4b are identified with the same reference numerals 8.1, 8.2, 8.3. in FIGS. 1 and 2.

In order to electrically insulate the conducting layers 8.1, 8.2, 8.3 inside the busbars 4a, 4b and the base body 6 of the coupling element 1 from each other, intermediate insulating layers 10 are arranged in between the conducting layers 8.1, 8.2, 8.3.

Figure 2:
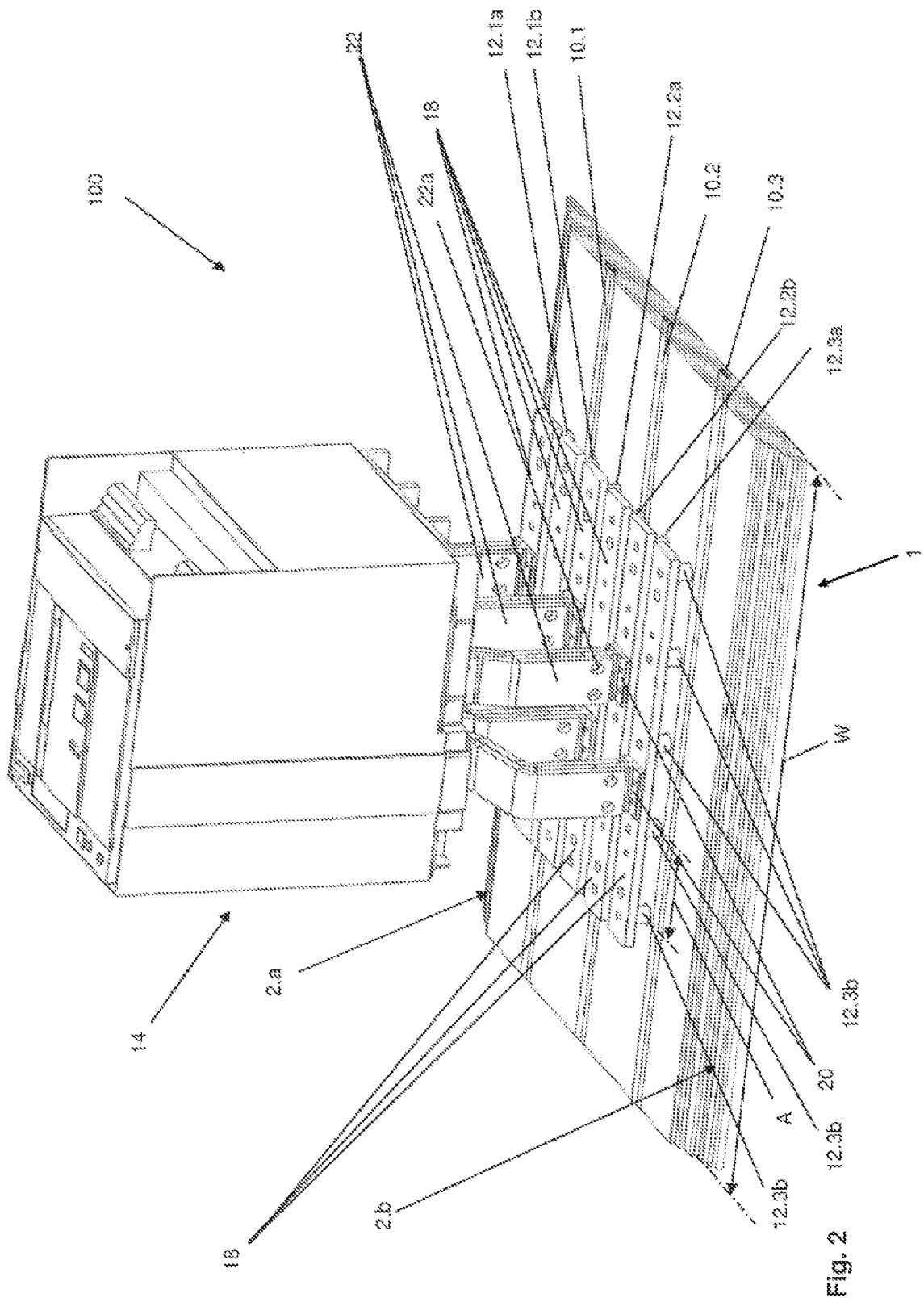
FIG. 2 is a schematic three-dimensional view of the arrangement shown in FIG. 1 without busbars.

As it can further be seen from FIGS. 1 and 2, each of the conducting layers 8.1, 8.2, 8.3 comprises a first layer section 8.1a, 8.2a, 8.3a which is associated to the lateral connecting portion 2a of the first busbar 4a and a second layer section 8.1b, 8.2b, 8.3b which is associated to the connecting portion 2b of the second busbar 4b.

In order to electrically insulate the first layer sections 8.1a, 8.2a, 8.3a from the second layer sections 8.1b, 8.2b, 8.3b inside the base body 6, an insulating element 10.1, 10.2, 10.3 is arranged between the neighboring lateral edges 16a, 16b of each of the first and second layer sections 8.1a, 8.2a, 8.3a, 8.1b, 8.2b, 8.3b. The insulating element 10.1, 10.2, 10.3 is preferably a strip of insulating material with preferably resilient and/or flexible properties, e.g. rubber or paper. In an alternative embodiment, the insulating may also be formed as a gap which may be generated by spacers arranged between the lateral edges of 16a, 16b or may be machined into the sheet metal of a conducting layer 8.1, 8.2, 8.3 when assembling the layer sandwich. As it is indicated in FIG. 2, the insulating element 10.1, 10.2, 10.3 preferably extends across the entire width W of the base body 6.

As it can further be seen from FIGS. 1 and 3, each of the first layer sections 8.1a, 8.2a, 8.3a comprises a first circuit breaker connecting terminal 12.1a, 12.2a, 12.3a which is adapted to be electrically connected to an input terminal 14.1a, 14.2a, 14.3a of a circuit breaker 14. In the same way, each of the second layer sections 8.1b, 8.2b, 8.3b comprises a second circuit breaker connecting terminal 12.1b, 12.2b, 12.3b which is adapted to be electrically connected to an output terminal 14.1b, 14.2b, 14.3b of the circuit breaker 14.

In the embodiment of the invention which is shown in FIG. 2 each of the first and second circuit breaker connecting terminals 12.1a, 12.2a, 12.3a, 12.1b, 12.2b, 12.3b comprises at least one cylindrical connecting pin which is mounted to an associated one of the first and second layer sections 8.1a, 8.2a, 8.3a, 8.1b, 8.2b, 8.3b of a corresponding conducting layer 8.1, 8.2, 8.3. Each of the cylindrical connecting pins projects away from the associated conducting layer 8.1, 8.2, 8.3 of the base body 6 in a perpendicular direction through a common hole which is formed in the sandwich of insulating layers 10 and conducting layers 8.1, 8.2, 8.3 of the base body 6 as it can be best seen in FIG. 1.

In order to more evenly distribute the electric current conducted in the conducting layers 8.1, 8.2, 8.3 over the entire width W of the base body 6, each of the first and second circuit breaker connecting terminals 12.1a, 12.2a, 12.3a and 12.1b, 12.2b, 12.3b comprises a plurality of cylindrical pins which are mounted and electrically connected to each layer section 8.1a, 8.2a, 8.3a, 8.1b, 8.2b, 8.3b. To do so, the plurality of cylindrical pins of each layer section 8.1a, 8.2a, 8.3a, 8.1b, 8.2b, 8.3b are arranged in a line at a distance A to each other across the width W of the base body 6. The free end portions of the cylindrical connecting pins of each row of pins are mechanically interconnected by an electrically conducting distribution bar 18 which is mounted to the free end portions of the cylindrical connecting pins, preferably by means of screws, as it is indicated in FIG. 2.

In order to provide for an easy, fast and flexible connection of the first and second circuit breaker connecting terminals 12.1a, 12.2a, 12.3a, 12.1b, 12.2b, 12.3b to the input terminals 14.1a, 14.2a, 14.3a and output terminals 14.1b, 14.2b, 14.3b of the circuit breaker 14, an L-shaped or T-shaped terminal member 20 is mounted at preferably the center of each distribution bar 18. The L-shaped or T-shaped terminal members 20 has an outer shape which is adapted to be contacted by a first end portion of a cranked and/or curved and/or angled connecting bar 22 which is formed of an electrically conducting and mechanically deformable material, like copper, so that the second end portion of the connecting bar 22 can be mechanically and electrically connected to an associated input terminal 14.1*a*, 14.2*a*, 14.3*a* and output terminal 14.1*b*, 14.2*b*, 14.3*b* of the circuit breaker 14.

For mechanically connecting the second end portion of the connecting bar 22 to the associated input or output terminal of the circuit breaker 14, the connecting bar may be clamped to the associated terminal by means of a clamping element 24. In this respect, the connecting bar 22 may alternatively be formed as a second cranked or curved or angled bar running in parallel which is connected to the connecting bar at first and/or second end portion thereof by means of screws or the like. The screws may extend through the associated input terminals 14.1*a*, 14.2*a*, 14.3*a* and output terminals 14.1*b*, 14.2*b*, 14.3*b* of the circuit breaker 14, as it is indicated in FIG. 2.

In order to electrically connect the lateral connecting portions 2*a* and 2*b* of two multi-layer busbars 4*a*, 4*b*, an arrangement 100 is used which comprises a coupling element 1 having a base body 6 to which a circuit breaker 14 is mounted as described herein before, so that the arrangement 100 can be assembled in a factory site and shipped for mounting to an installation site as one unit While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LISTING OF REFERENCE NUMERALS 1 coupling element
2*a* first lateral connecting portion of first busbar
2*b* second lateral connecting portion of first busbar
4*a* first laminated busbar
4*b* second laminated busbar
6 base body
8.1-8.3 conducting layers of coupling element
8.1*a*-8.3*a* first layer sections of conducting layers
81*b*-8.3*b* second layer sections of conducting layers
10 intermediate insulating layers
10.1-10.3 insulating elements
12.1*a*-12.3*a* first circuit breaker connecting terminals
12.1*b*-12.3*b* second circuit breaker connecting terminals
14.1*a*-14.3*a* input terminals of a circuit breaker
14.1*b*-14.3*b* output terminals of a circuit breaker
14 circuit breaker
16*a* lateral edge of first layer section
16*b* lateral edge of second layer section
18 distribution bar
20 L-shaped or T-shaped terminal member
22 curved and/or angled connecting bar
24 clamping elements of connecting bar
100 Arrangement including coupling element and circuit breaker
A distance between first and second cylindrical connecting pins
W width of coupling element
L1, L2, L3 electrical phase

What is claimed is:

1. A coupling element for electrically coupling a lateral connecting portion of a first laminated busbar to a lateral connecting portion of a second laminated busbar, the coupling element having a base body that comprises a sandwich of conducting layers of sheet metal and intermediate insulating layers arranged in between the conducting layers for electrically insulating the conducting layers from each other, wherein:
   each of the conducting layers comprises a first layer section that is associated to the lateral connecting portion of the first busbar and a second layer section that is associated to the connecting portion of the second busbar,
   the first and second layer sections are electrically insulated from each other by an insulating element and wherein each of the first layer sections comprises a first circuit breaker connecting terminal that is adapted to be electrically connected to an input terminal of a circuit breaker, and
   each of the second layer sections comprises a second circuit breaker connecting terminal that is adapted to be electrically connected to an output terminal of the circuit breaker.

2. The coupling element according to claim 1, wherein the insulating element comprises a strip of insulating material or a gap that extends across a width of the base body between neighboring lateral edges of the first and second layer section of each conducting layer of the base body.

3. The coupling element according to claim 2, wherein the insulating element is formed of a plastic material.

4. The coupling element according to claim 1, wherein each of the first and second circuit breaker connecting terminals comprises at least one cylindrical connecting pin that is mounted to an associated one of the first and second layer sections of a corresponding conducting layer of the base body and that projects away from the conducting layer through a common hole that is formed in the sandwich of insulating layers and conducting layers of the base body.

5. The coupling element according to claim 4, wherein each of the first and second circuit breaker connecting terminals comprises a plurality of cylindrical pins mounted at each layer section that are arranged in at least one line at a distance from each other across the width of the base body, and that the at least one line of connecting pins that are connected to a same layer section are mechanically interconnected by an electrically conducting distribution bar that is mounted to a free end portion of the cylindrical connecting pins, preferably by means of screws.

6. The coupling element according to claim 5, wherein each of the first and second circuit breaker connecting terminals comprises an L-shaped or T-shaped terminal member mounted at an associated electrically conducting distribution bar that is adapted to be contacted by a first end portion of a cranked and/or curved and/or angled connecting bar that is adapted to be mechanically and electrically connected to a respective one of the input terminals and output terminals of the circuit breaker with a second end portion of the connecting bar.

7. The coupling element according to claim 6, wherein the connecting bar comprises clamping elements for mechanically clamping the first end portion of the connecting bar to the L-shaped or T-shaped terminal member of the first and second circuit breaker connecting terminals and an associated input terminal or output terminal of the circuit breaker.

8. An arrangement for electrically coupling the lateral connecting portion of the first laminated busbar to the lateral connecting portion of the second laminated busbar comprising the coupling element according to claim 1 and the circuit breaker mounted to the coupling element.

9. A switch gear including the arrangement according to claim 8.

10. The coupling element according to claim 3, wherein the plastic material comprises at least one member of a group consisting of a fiber reinforced resin and a strip of cured resin.

\* \* \* \* \*